(12) United States Patent
Carrier et al.

(10) Patent No.: US 11,068,664 B2
(45) Date of Patent: Jul. 20, 2021

(54) GENERATING COMMENT EXCERPTS WITHIN AN ONLINE PUBLICATION

(71) Applicant: INTERNATIONAL BUSINESS MACHINES CORPORATION, Armonk, NY (US)

(72) Inventors: Scott Carrier, Apex, NC (US); Dwi Sianto Mansjur, Cary, NC (US); Brendan Bull, Durham, NC (US); Andrew G. Hicks, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/556,467

(22) Filed: Aug. 30, 2019

(65) Prior Publication Data

US 2021/0064701 A1    Mar. 4, 2021

(51) Int. Cl.
*G06F 40/30*    (2020.01)
*G06F 16/958*   (2019.01)
(Continued)

(52) U.S. Cl.
CPC ............ *G06F 40/30* (2020.01); *G06F 3/0484* (2013.01); *G06F 3/04817* (2013.01);
(Continued)

(58) Field of Classification Search
CPC .. G06F 16/958; G06F 3/04817; G06F 3/0484; G06F 40/289; G06F 40/30; G06F 40/169; G06F 40/58
See application file for complete search history.

(56) References Cited

U.S. PATENT DOCUMENTS 8,745,067 B2 *  6/2014  Cierniak ................. G06F 16/22
                                                        707/749
8,972,413 B2    3/2015  Lee
(Continued)

OTHER PUBLICATIONS

Swapna Gottipati and Jing Jiang, "Extracting and Normalizing Entity-Actions from USers' Comments", Dec. 2012, Proceedings of Coling 2012, pp. 421-430 (Year: 2012).*
(Continued)

*Primary Examiner* — Chau T Nguyen
(74) *Attorney, Agent, or Firm* — Steven M. Bouknight

(57) ABSTRACT

A method for generating and presenting a comment excerpt in an online publication based on a comment in a comments section is provided. The method may include determining whether a passage from the comment in the comments section is relevant to a sentence in the online publication, and in response to determining that the passage from the comment is relevant to the sentence in the online publication, extracting the passage from the comment. The method may further include determining the scope of the comment that is associated with the extracted passage, wherein determining the scope of the comment comprises determining a context associated with the extracted passage based on text surrounding the extracted passage. The method may further include, based on the determined scope of the comment, generating the comment excerpt that corresponds to the comment. The method may further include presenting the comment excerpt within the online publication.

20 Claims, 13 Drawing Sheets

(51) Int. Cl.
  *G06F 3/0484* (2013.01)
  *G06F 3/0481* (2013.01)
  *G06F 40/289* (2020.01)
  *G06F 40/169* (2020.01)
  *G06F 40/58* (2020.01)

(52) U.S. Cl.
  CPC .......... *G06F 16/958* (2019.01); *G06F 40/169* (2020.01); *G06F 40/289* (2020.01); *G06F 40/58* (2020.01)

(56) References Cited

U.S. PATENT DOCUMENTS

| | | |
|---|---|---|
| 9,401,947 B1 | 7/2016 | Oztaskent |
| 9,672,555 B1* | 6/2017 | Dillard ............... G06Q 30/0282 |
| 9,923,860 B2 | 3/2018 | Krishnaswamy |
| 9,965,470 B1* | 5/2018 | Fox ....................... G06F 16/345 |
| 9,965,475 B2 | 5/2018 | Gan |
| 2008/0133488 A1* | 6/2008 | Bandaru ............... G06F 16/951 |
| 2012/0330968 A1* | 12/2012 | Lee ....................... G06F 16/951 707/748 |
| 2016/0162500 A1* | 6/2016 | Wilson .................. G06F 16/958 715/234 |
| 2017/0142044 A1* | 5/2017 | Ball ....................... G06Q 50/01 |
| 2018/0067985 A1* | 3/2018 | Grossman ............. G06F 3/0482 |
| 2018/0357323 A1* | 12/2018 | Allen .................... G06F 16/958 |

OTHER PUBLICATIONS

Meishan Hu, Aixin Sun and Ee-Peng Lim, "Comments-Oriented Blog Summarization by Sentence Extraction", Nov. 2007, Copyright 2007 ACM, pp. 901-904 (Year: 2007).*

Mell et al., "The NIST Definition of Cloud Computing", National Institute of Standards and Technology, Special Publication 800-145, Sep. 2011, 7 pages.

* cited by examiner

GENERATING COMMENT EXCERPTS WITHIN AN ONLINE PUBLICATION

BACKGROUND

The present invention relates generally to the field of computing, and more specifically, to rendering online comment excerpts in context with text associated with an online publication on a computing device.

Generally, websites and applications may include online publications such as medical journals, scientific journals, law journals, and other texts and blogs covering a wide variety of topics. Furthermore, some of the websites and applications may include a comments section which typically follows the text associated with the published content. Specifically, the comments section is a feature of websites and applications that may allow an audience to provide commentary or feedback regarding the publication and/or specific text within the publication. In some cases, a comment in the comments section may be highly relevant and insightful to a specific passage in the publication. Typically, the audience may read the published content followed by the comments or, in some cases, may actually read the comments first and then the published content.

SUMMARY

A method for generating and presenting at least one comment excerpt in an online publication based on a comment in a comments section associated with the online publication is provided. The method may include determining whether at least one passage from the comment in the comments section is relevant to at least one sentence in the online publication, and in response to determining that the at least one passage from the comment in the comments section is relevant to the at least one sentence in the online publication, extracting the at least one passage from the comment. The method may further include determining the scope of the comment that is associated with the extracted at least one passage, wherein determining the scope of the comment comprises determining a context associated with the extracted at least one passage based on text surrounding the extracted at least one passage in the comment. The method may further include, based on the determined scope of the comment, generating the at least one comment excerpt that corresponds to the comment in the comments section, wherein the at least one comment excerpt includes the extracted at least one passage and extracted surrounding text based on the determined scope of the comment. The method may further include presenting the at least one comment excerpt within the online publication by aligning the at least one comment excerpt with the at least one sentence in the online publication.

A computer system for generating and presenting at least one comment excerpt in an online publication based on a comment in a comments section associated with the online publication is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining whether at least one passage from the comment in the comments section is relevant to at least one sentence in the online publication, and in response to determining that the at least one passage from the comment in the comments section is relevant to the at least one sentence in the online publication, extracting the at least one passage from the comment. The method may further include determining the scope of the comment that is associated with the extracted at least one passage, wherein determining the scope of the comment comprises determining a context associated with the extracted at least one passage based on text surrounding the extracted at least one passage in the comment. The method may further include, based on the determined scope of the comment, generating the at least one comment excerpt that corresponds to the comment in the comments section, wherein the at least one comment excerpt includes the extracted at least one passage and extracted surrounding text based on the determined scope of the comment. The method may further include presenting the at least one comment excerpt within the online publication by aligning the at least one comment excerpt with the at least one sentence in the online publication.

A computer program product for generating and presenting at least one comment excerpt in an online publication based on a comment in a comments section associated with the online publication is provided. The computer program product may include one or more computer-readable storage devices and program instructions stored on at least one of the one or more tangible storage devices, the program instructions executable by a processor. The computer program product may include program instructions to determine whether at least one passage from the comment in the comments section is relevant to at least one sentence in the online publication, and in response to determining that the at least one passage from the comment in the comments section is relevant to the at least one sentence in the online publication, extracting the at least one passage from the comment. The computer program product may also include program instructions to determine the scope of the comment that is associated with the extracted at least one passage, wherein determining the scope of the comment comprises determining a context associated with the extracted at least one passage based on text surrounding the extracted at least one passage in the comment. The computer program product may further include, based on the determined scope of the comment, program instructions to generate the at least one comment excerpt that corresponds to the comment in the comments section, wherein the at least one comment excerpt includes the extracted at least one passage and extracted surrounding text based on the determined scope of the comment. The computer program product may include program instructions to present the at least one comment excerpt within the online publication by aligning the at least one comment excerpt with the at least one sentence in the online publication.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
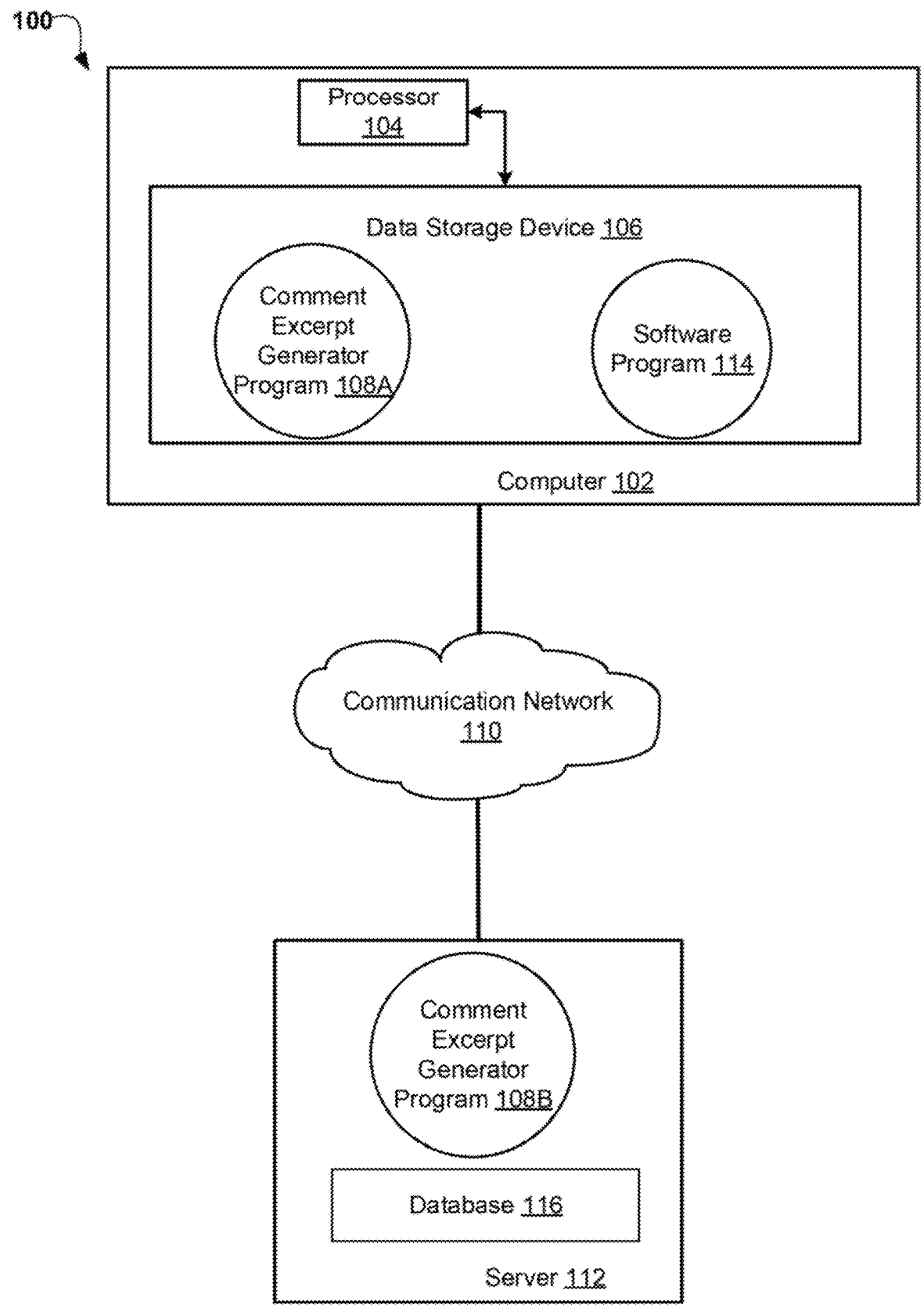
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

As previously described, embodiments of the present invention relate generally to the field of computing, and more particularly, to rendering online comment excerpts in context with an online publication on a computing device. The following described exemplary embodiments provide a system, method and program product for generating and presenting the comment excerpts in context with the online publication. Specifically, the present invention has the capacity to improve the technical field associated with online publications by allowing readers of online publications to view comment excerpts, extracted from a comments section, in context with the content associated with the online publication. By generating and presenting the comment excerpts in context with online publications, the present invention may thereby reduce the need for readers to scroll down to the comments section and cipher through comments to discover those that are particularly relevant to the published content. Specifically, the system, method and program product may identify and extract relevant comment passages from a comments section of an online publication, identify the scope of the relevant comment passages based on the surrounding text associated with the relevant comment passages, and generate in-context with the text associated with the online publication the relevant comment passages based on the identified scope.

As previously described with respect to online publications, a comments section may be displayed following the online publication to allow audiences to provide commentary or feedback regarding the online publication. Thus, the comments section is oftentimes segregated from the online publication itself. Typically, the audience may read the published content followed by the comments or, in some cases, may actually read the comments first and then the published content. In either case, the comments that may reference the online publication may be read out of context from the content within the online publication. Specifically, in some cases, a comment in the comments section may be highly relevant and insightful to a specific passage in the publication. As such, it may be advantageous, among other things, to provide a method, computer system, and computer program product for generating and presenting comment excerpts in context with content associated with an online publication. Specifically, the method, computer system, and computer program product may identify and extract relevant comment text from a comments section of an online publication, identify the scope of the relevant comment text based on the surrounding text associated with the relevant comment text, and generate in-context with the text associated with the online publication the relevant comment text based on the identified scope.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run a comment excerpt generator program 108A and a software program 114, and may also include a microphone (not shown). The software program 114 may be an application program such as an internet browser and/or one or more mobile apps running on a client computer 102, such as a desktop, laptop, tablet, and mobile phone device. The comment excerpt generator program 108A may communicate with the software program 114. The networked computer environment 100 may also include a server 112 that is enabled to run a comment excerpt generator program 108B and the communication network 110. The networked computer environment 100 may include a plurality of computers 102 and servers 112, only one of which is shown for illustrative brevity. For example, the plurality of computers 102 may include a plurality of interconnected devices, such as the mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the comment excerpt generator program 108A, 108B may interact with a database 116 that may be embedded in various storage devices, such as, but not limited to, a mobile device 102, a networked server 112, or a cloud storage service.

According to the present embodiment, a program, such as a comment excerpt generator program 108A and 108B may run on the client computer 102 and/or on the server computer 112 via a communications network 110. The comment excerpt generator program 108A, 108B may generate and present comment excerpts in context with content within an online publication that is presented on client computer 102. Specifically, a user using a client computer 102, such as a laptop device, may run a comment excerpt generator program 108A, 108B that may interact with a software program 114, such as a website, to identify and extract relevant sentence from a comment in a comments section associated with an online publication, determine the context surrounding the relevant sentence (i.e. the scope of the comment), and generate in the text associated with the online publication a comment excerpt including the relevant sentence and the surrounding context (i.e. scope) associated with the relevant sentence.

Figure 2:
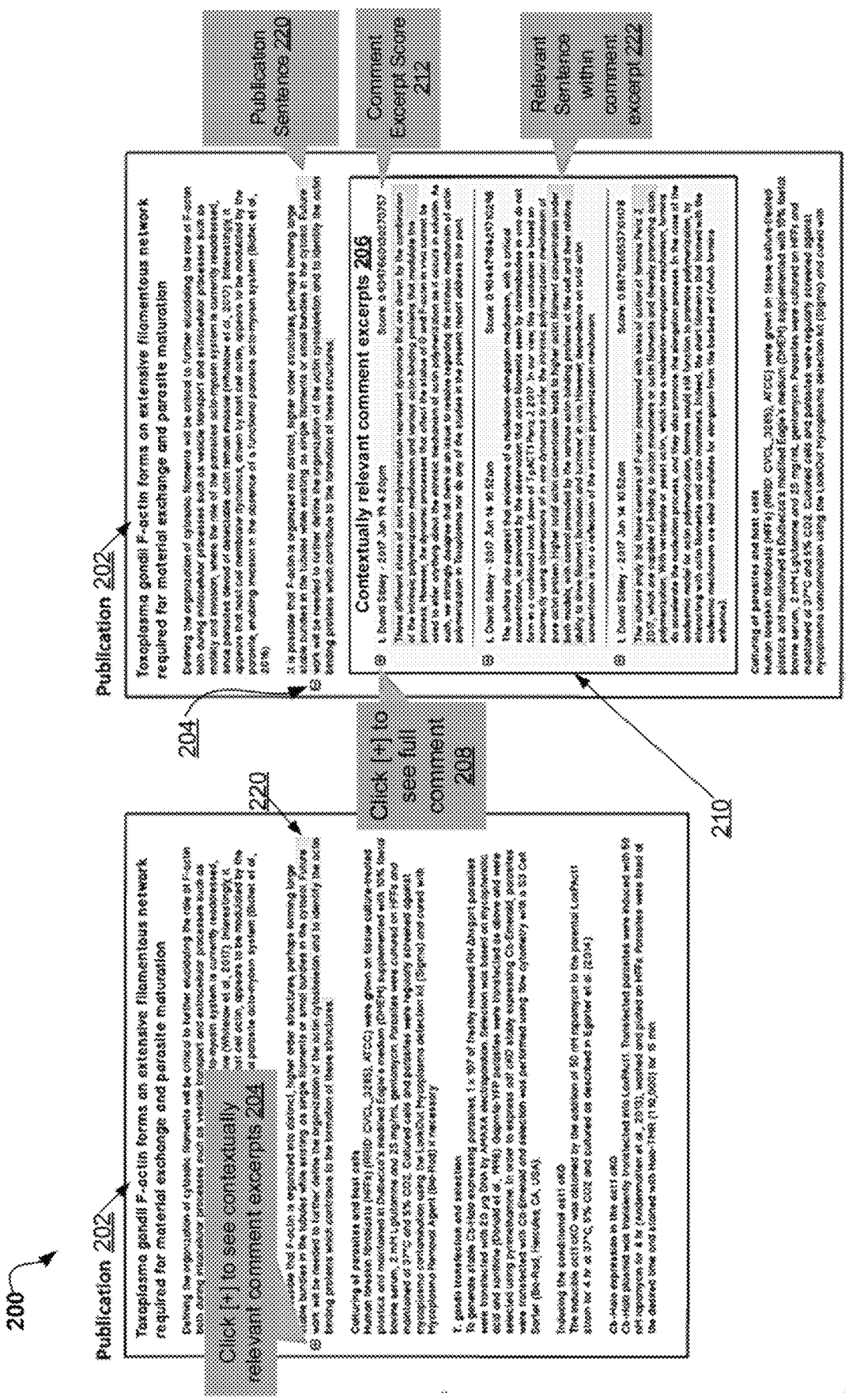
FIG. 2 is a visual representation of an embodiment of a comment excerpt generator program according to one embodiment.

Referring now to FIG. 2, a visual representation of an embodiment 200 of the present invention is depicted. Specifically, the comment excerpt generator program 108A, 108B may generate and display comment excerpts 206 in context with or in-line with the text of online publications. As illustrated in FIG. 2, and according to one embodiment, a publication 202 may be presented on a software program 114 (FIG. 1), such as a website and/or a mobile application. As previously described, the comment excerpt generator program 108A, 108B may interact with the software program 114 to identify and extract relevant comment text from a comments section (not shown) associated with the online publication 202. Specifically, and as described in greater detail with reference to FIG. 3, using natural language processing techniques, the comment excerpt generator program 108A, 108B may determine that one or more sentences or passages associated with a comment in the comments section is relevant to one or more sentences and/or passages in the online publication 202. For example, the comment excerpt generator program 108A, 108B may determine that a sentence 222 in a comment associated with the comments section may be relevant to the last sentence 220 in the second paragraph of the online publication 202 as depicted in FIG. 2.

Thereafter, and as described in greater detail with reference to FIGS. 4-10, the comment excerpt generator program 108A, 108B may determine the scope of the comment based on the text surrounding the relevant sentence 222 in the comment, whereby determining the scope of the comment includes determining how much of the surrounding text to extract and initially present with the relevant sentence 222 in the comment excerpt 206. Specifically, for example, a comment may include 10 sentences, and the comment excerpt generator program 108A, 108B may determine that at least one of the sentences 222 is highly relevant to a sentence in the online publication 202. Thereafter, the comment excerpt generator program 108A, 108B may determine the scope of the comment, or more specifically, determine how much of the surrounding context to extract and initially present with the relevant sentence 222, by determining that 2 other sentences in the comment are necessary for capturing the context of the highly relevant sentence 222. Therefore, the comment excerpt generator program 108A, 108B may determine that the scope of the comment is captured by the 3 sentences (i.e. the relevant sentence and the 2 other sentences for context) and, in turn, may extract and present the 3 sentences in a comment excerpt 206 that is incorporated within the text in the online publication 202. The comment excerpt generator program 108A, 108B may also provide a user with the option to view the full comment in the online publication.

For example, according to one embodiment, based on the determination that a sentence 222 associated with a comment in the comments section may be relevant to a sentence 220 in the online publication 202, the comment excerpt generator program 108A, 108B may highlight the publication sentence 220 in the online publication 202 and/or cause the publication sentence 220 to be highlighted when a user clicks on and/or moves a cursor over the publication sentence 220. Furthermore, the comment excerpt generator program 108A, 108B may generate an expand and collapse icon/button 204 adjacent to, or aligned with, the highlighted publication sentence 220. Specifically, the expand and collapse icon/button 204 may, for example, be presented in a margin next to the highlighted publication sentence 220. The comment excerpt generator program 108A, 108B may allow a user to click on the expand/collapse icon 204 to view one or more comment excerpts 206 in context with, or in-line with, the highlighted publication sentence 220, whereby the one or more comment excerpts 206 are based on the comments in a comments section and are relevant to the highlighted publication sentence 220. For example, and as depicted in FIG. 2, in response to a user clicking on the expand/collapse icon 204, the comment excerpt generator program 108A, 108B may display a comment excerpt window 210 that includes 3 comment excerpts 206 derived from the comments in the comments section and relevant to the publication sentence 220. As previously described, each of the comment excerpts 206 may include a relevant sentence 222 from its corresponding comment that is determined by the comment excerpt generator program 108A, 108B to be relevant to the publication sentence 220 as well as may include one or more sentences surrounding the relevant sentence 222 to represent the scope of the comment and give context to the relevant sentence 222. The comment excerpt generator program 108A, 108B may also highlight the relevant sentence 222 within each comment excerpt 206 and/or cause the relevant sentence 222 to be highlighted when a user clicks on and/or moves a cursor over the relevant sentence 222. Additionally, and as described in greater detail with reference to FIG. 3, the comment excerpt generator program 108A, 108B may also display a comment excerpt score 212 to represent a degree of relevance that the comment excerpt 206 has to the publication sentence 220 based on the relevant sentence 222.

Furthermore, according to one embodiment, the comment excerpt generator program 108A, 108B may generate one or more second expand/collapse icons 208 for each of the comment excerpts 206 to allow a user to view in the comment excerpt window 210 the full comment associated with its respective comment excerpt 206. For example, and as previously described, the comment excerpt generator program 108A, 108B may extract 3 out of 10 sentences from a comment that represent the scope of the comment and initially display the 3 extracted sentences in a comment excerpt 206. However, based on a user clicking on a second expand/collapse icon 208 that is adjacent to the respective comment excerpt 206, the comment excerpt generator program 108A, 108B may present the full comment in the comment excerpt window 210 by expanding the comment excerpt window 210 (or more particularly, expanding a window corresponding to the respective comment excerpt 206 that is within the comment excerpt window 210) in order to display the rest of the sentences/text associated with the full comment from the comments section. The comment excerpt generator program 108A, 108B may also collapse the respective comment excerpt 206 and allow the user to return to a shortened view of the comment excerpt 206 (i.e. a view of just the 3 extracted sentences), based on the user again clicking on the second expand/collapse icon 208. The comment excerpt generator program 108A, 108B may also entirely collapse the comment excerpt window 210, and thereby hide all of the comment excerpts 206, in response to the user clicking on the expand/collapse icon 204 when the comment excerpt window 210 is in an expanded view (i.e. displaying/showing the comment excerpts 206).

Figure 3:
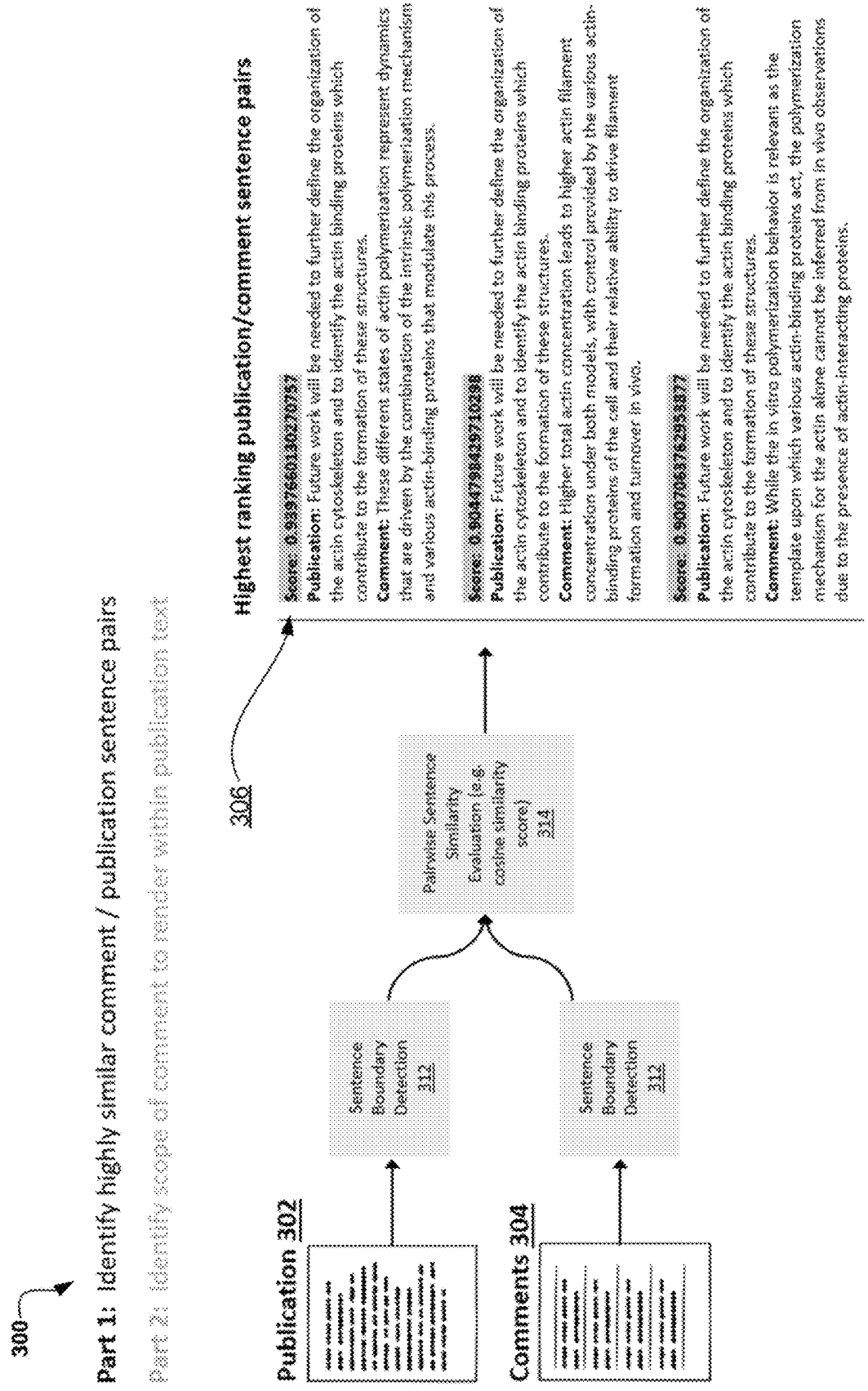
FIG. 3 is an exemplary diagram illustrating the natural language processing techniques associated with an aspect of the present invention according to one embodiment.

Referring now to FIG. 3, an exemplary diagram 300 illustrating a natural language processing technique associated with the comment excerpt generator program 108A, 108B for specifically identifying similarities between a comment in the comments section 304 and a sentence in an online publication 302 as well as for determining a relevancy score 306 for the comment according to one embodiment is depicted. Specifically, part one of the process associated with the comment excerpt generator program 108A, 108B for generating and displaying comment excerpts in an online publication may include identifying comment/publication sentence pairs. As previously described, and as depicted in FIG. 3, the comment excerpt generator program 108A, 108B may identify and extract comments from a comments section 304 that is associated with an online publication 302. Specifically, using natural language processing techniques, the comment excerpt generator program 108A, 108B may determine that one or more sentences or passages associated with a comment in the comments section 304 is similar and/or relevant to one or more sentences and/or passages in the online publication 302. More specifically, the comment excerpt generator program 108A, 108B may use known natural language processing techniques such as Cosine Similarity and Jaccard Similarity to detect similarities and calculate the relevancy between sentences in the online publication and sentences in the comments.

For example, at sentence boundary detection 312 in FIG. 3, the comment excerpt generator program 108A, 108B may detect sentences in the online publication 302 as well as detect sentences in each of the comments associated with the comments section 304. Thereafter, at 314, the comment excerpt generator program 108A, 108B may perform pairwise cosine similarity and/or Jaccard similarity on each of the sentences to determine similarities between the sentences detected in the comments and the sentences detected in the online publication. Based on at least one of the natural language processing techniques, the comment excerpt generator program 108A, 108B may identify highly similar comment/publication sentence pairs (i.e. determine that at least one comment sentence is highly relevant to at least one publication sentence) as well as calculate a relevancy score to indicate the relevancy of the sentence in the comments 304 to the sentence in the online publication 302. For example, based on the natural language processing technique, the comment excerpt generator program 108A, 108B may determine that a comment may contain the sentence: "These different states of actin polymerization represent dynamics that are driven by the combination of the intrinsic polymerization mechanism and various actin-binding proteins that modulate this process." Also, based on the natural language processing technique, the comment excerpt generator program 108A, 108B may determine that the sentence in the comments is highly relevant to a sentence in the online publication that states: "Future work will be needed to further define the organization of the actin cytoskeleton and to identify the actin binding proteins which contribute to the formation of these structures." Furthermore, using the natural language processing technique, the comment excerpt generator program 108A, 108B may determine that the relevancy score for the pair of sentences (i.e. the sentence in the comments and the sentence in the online publication) is 0.939766013027057, whereby according to one embodiment, a relevancy score greater than 0.90 indicates that a sentence in the comments is highly relevant to a sentence in the online publication.

Figure 4:
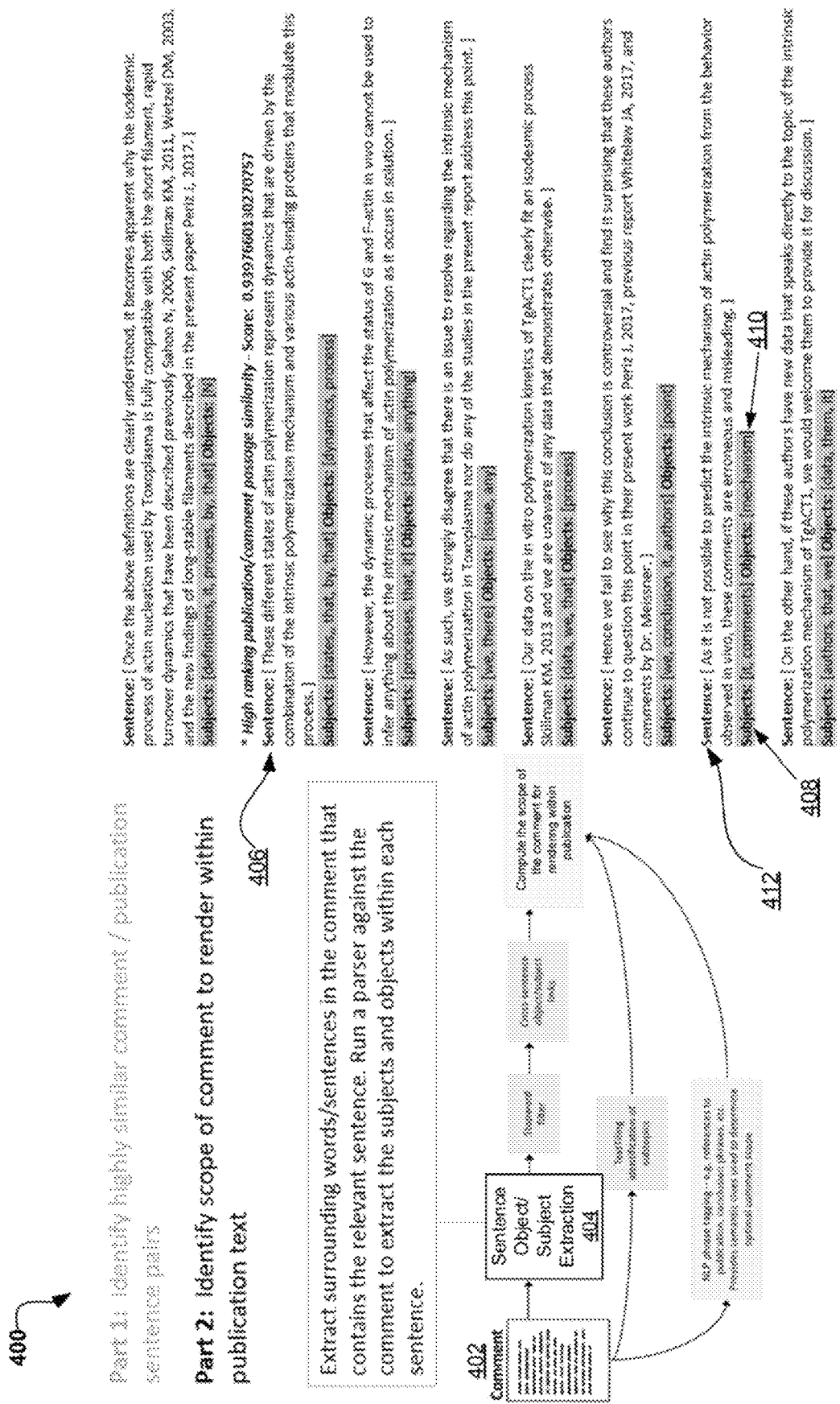
FIG. 4 is an exemplary diagram illustrating a first step in a process associated with the comment excerpt generator program for identifying the scope of a comment extracted from a comments section according to one embodiment.

Referring now to FIG. 4, an exemplary diagram 400 illustrating a step 404 in a process associated with the comment excerpt generator program 108A, 108B for identifying the scope of the comment based on the relevant sentence according to one embodiment is depicted. As previously described in FIG. 3, part one of the process for generating and displaying comment excerpts in context with online publications may include identifying highly similar comment/publication sentence pairs. Specifically, and as previously described in FIGS. 2 and 3, the comment excerpt generator program 108A, 108B may determine that a sentence associated with a comment in the comments section 304 (FIG. 3) may be relevant to a sentence 220 (FIG. 2) in the online publication 302 (FIG. 3). Thus, the comment excerpt generator program 108A, 108B may identify the sentence in the comment as the relevant sentence. Thereafter, part two of the process for generating and displaying comment excerpts in the online publication may include identifying the scope of the comment based on the relevant sentence to display a shortened version of the comment in a comment excerpt 206. Part two may be described with reference to the following discussion of FIGS. 4-10.

As illustrated in FIG. 4 at 404, the comment excerpt generator program 108A, 108B may determine the scope of the comment by first extracting each of the sentences in the comment that is associated with the relevant sentence as well as the subjects and objects of each sentence. Specifically, as shown for the comment 402, the comment excerpt generator program 108A, 108B may extract a relevant sentence 406 that is deemed highly relevant to a sentence in an online publication as described in FIG. 3, as well as extract the 7 other sentences in the comment 402. For each of the sentences, the comment excerpt generator program 108A, 108B may use a natural language processing technique to run a parser on the sentences and extract the subjects 408 and objects 410 within each sentence. For example, for a sentence 412, the comment excerpt generator program 108A, 108B may use a natural language processing technique to run a parser on the sentence and extract the subjects 408, "it, comments," and the object 410, "mechanism."

Figure 5:
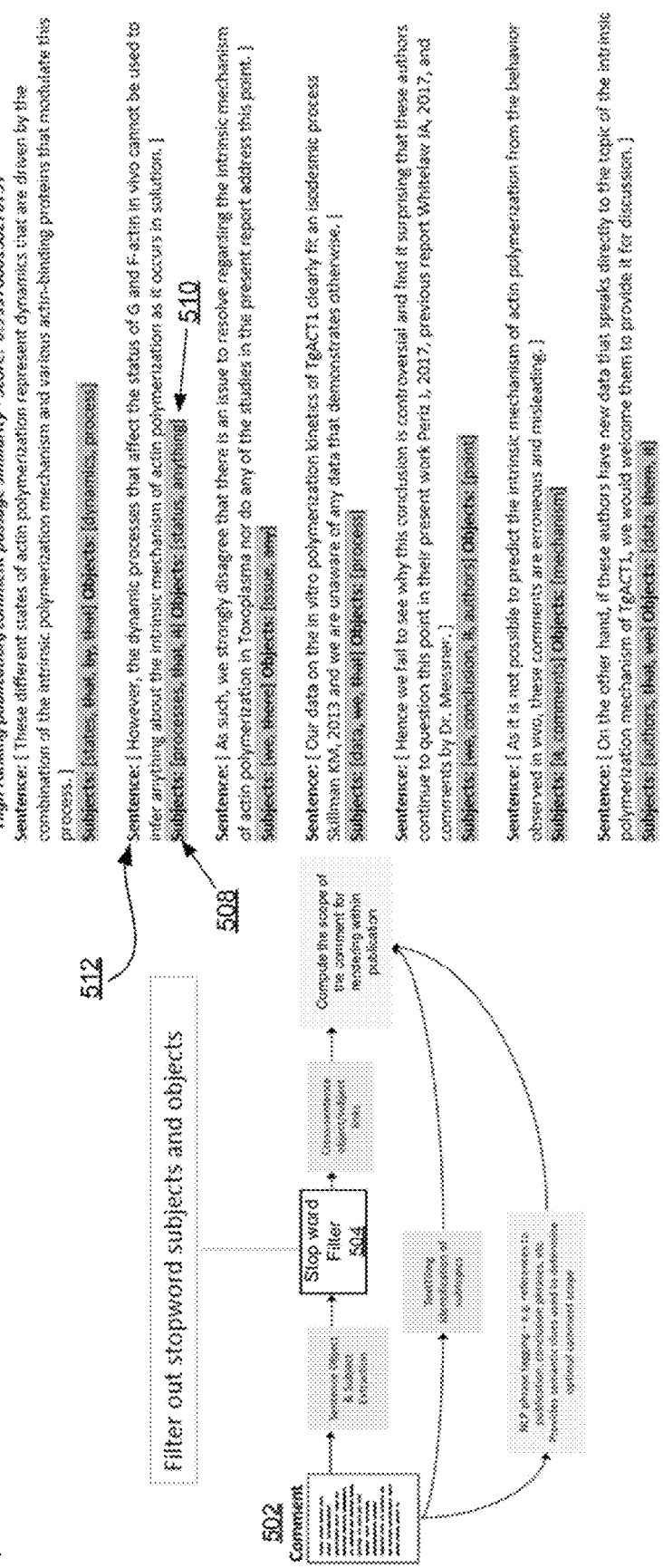
FIG. 5 is an exemplary diagram illustrating a second step in a process associated with the comment excerpt generator program for identifying the scope of a comment extracted from a comments section according to one embodiment.

Next, in FIG. 5, an exemplary diagram 500 illustrating a step 504 in the comment excerpt generator program 108A, 108B for identifying the scope of the comment according to one embodiment is depicted. Specifically, at step 504, the comment excerpt generator program 108A, 108B may filter out stop words from the subjects and objects associated with the sentences that are extracted from the comments. As previously described in FIG. 4, for each of the sentences that are extracted from a comment, the comment excerpt generator program 108A, 108B may use a natural language processing technique to also extract the subjects 408 and objects 410 within each sentence. Thereafter, and as illustrated in FIG. 5 at 504, the comment excerpt generator program 108A, 108B may filter out the stop words from each of the identified subjects 508 and objects 510. Specifically, while there is no universal list of stop words used by natural language processing tools/techniques, the stop words may generally include the most common words in a given language such as "the", "is," "at," "which," and "on." For example, as shown in FIG. 5, and continuing from the example in FIG. 4, the comment excerpt generator program 108A, 108B may filter out the stop words in the third sentence 512, whereby the stop words may include the words "that" and "it" from the extracted subjects 508. The comment excerpt generator program 108A, 108B may accordingly use a natural language processing technique on each of the sentences that are extracted from the comment 502 to extract the stop words in the subjects 508 and objects 510 within each sentence.

Figure 6:
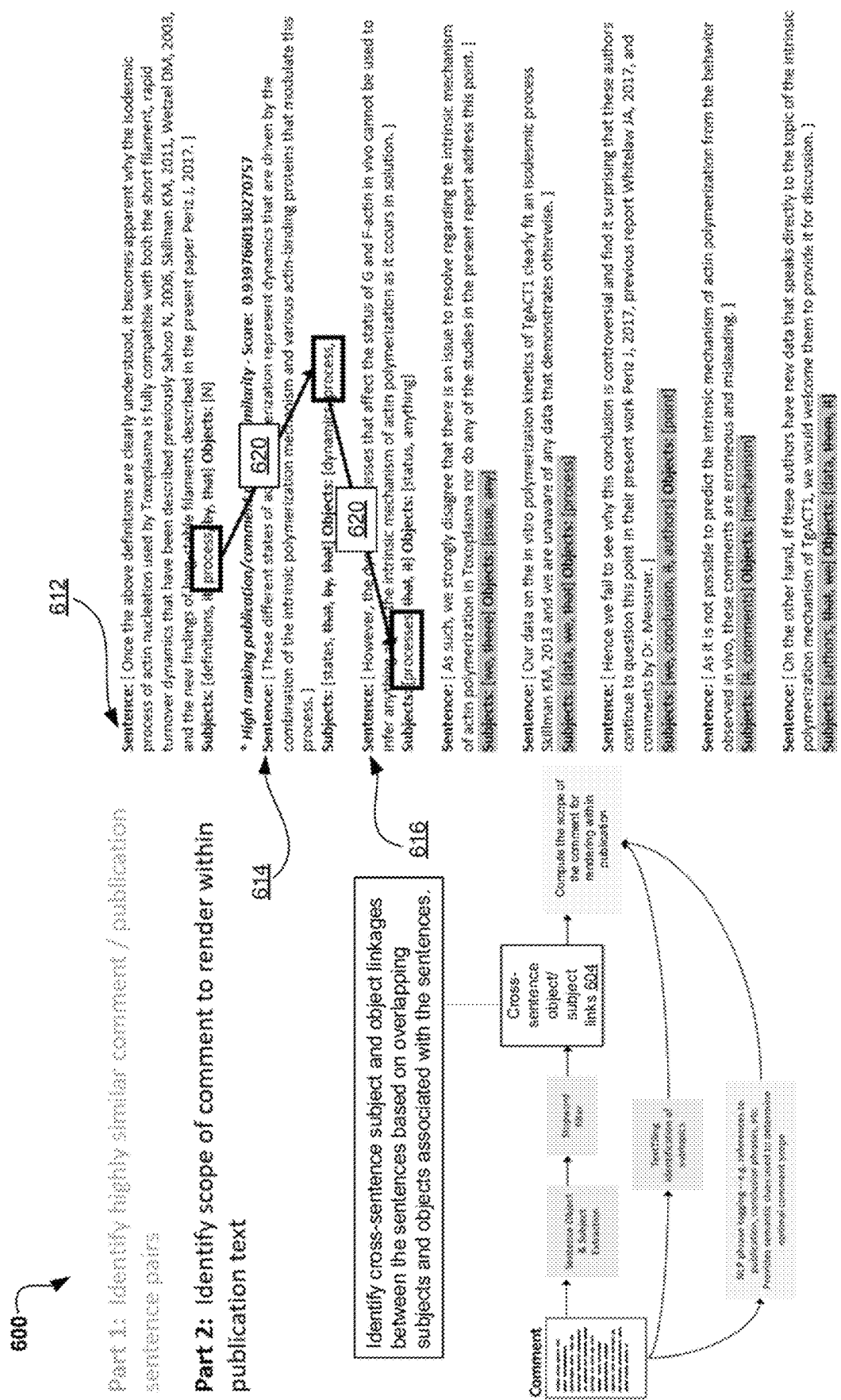
FIG. 6 is an exemplary diagram illustrating a third step in a process associated with the comment excerpt generator program for identifying the scope of a comment extracted from a comments section according to one embodiment.

Then, in FIG. 6, an exemplary diagram 600 illustrating a step 604 in the comment excerpt generator program 108A, 108B for identifying the scope of the comment according to one embodiment is depicted. Specifically, at 604, the comment excerpt generator program 108A, 108B may identify cross-sentence subject and object linkages. As previously described in FIG. 5, the comment excerpt generator program 108A, 108B may use a natural language processing technique to filter out the stop words from each of the identified subjects 508 and objects 510 from the extracted sentences. Thereafter, and as illustrated in FIG. 6 at 604, the comment excerpt generator program 108A, 108B may also use the natural language processing technique to identify cross-sentence subject and object linkages 620 between the subjects 608 and objects 610 associated with the extracted sentences. The identified cross-sentence subject and object linkages 620 may establish a linkage between the relevant sentence 614 and one or more sentences surrounding the relevant sentences in the comment based on subject and objects that overlap between the sentences. For example, the comment excerpt generator program 108A, 108B may identify a cross-sentence subject and object linkage 620 between a subject in the first sentence 612, an object in the relevant sentence 614, and a subject in the third sentence 616, based on each of the sentences including the overlapping word—"process." Therefore, the comment excerpt generator program 108A, 108B may determine that there may be a link between the relevant sentence 614 and the first and third sentences 612, 616.

Figure 7:
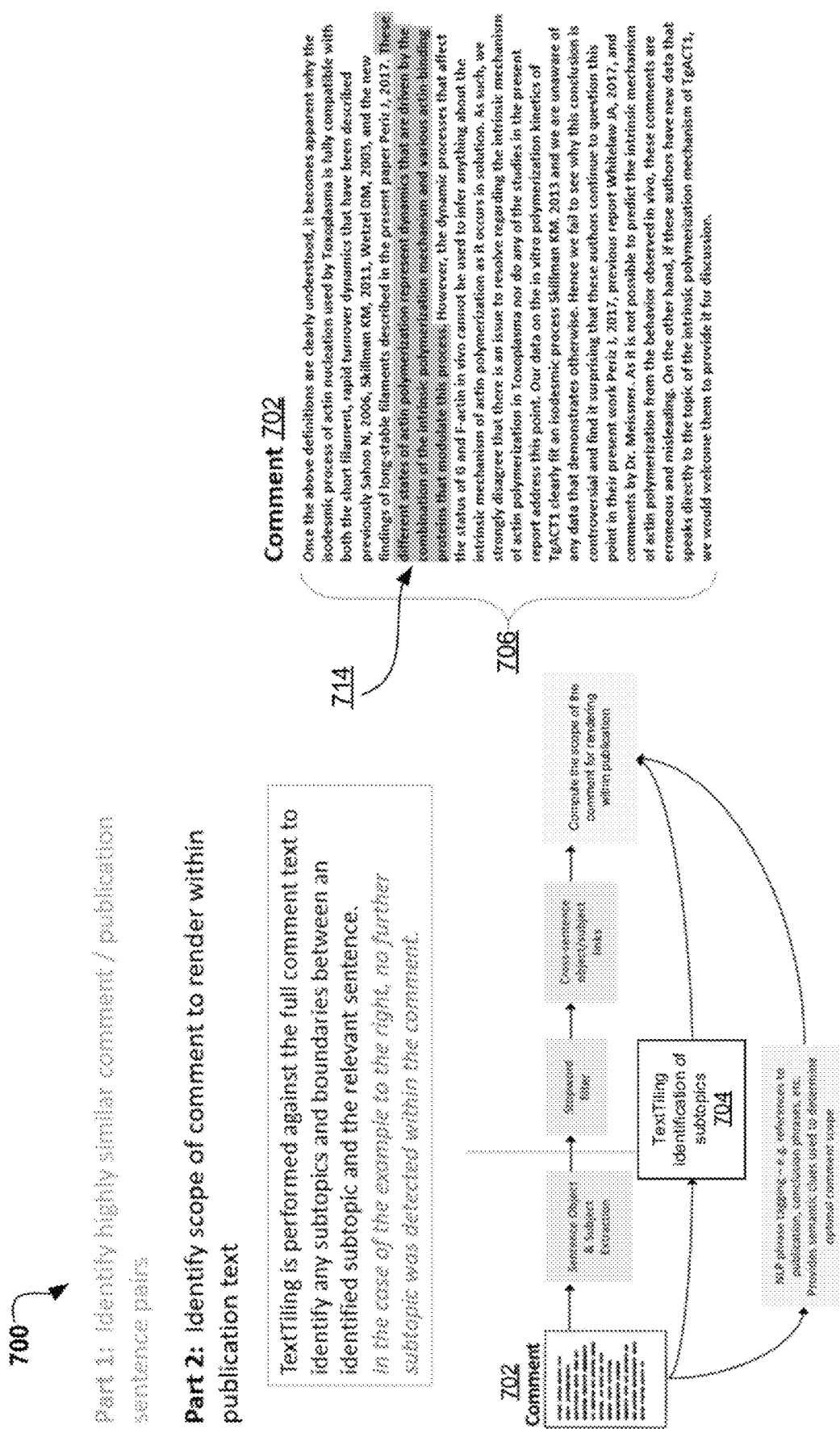
FIG. 7 is an exemplary diagram illustrating a fourth step in a process associated with the comment excerpt generator program for identifying the scope of a comment extracted from a comments section according to one embodiment.

Next, in FIG. 7, an exemplary diagram 700 illustrating a step 704 in the comment excerpt generator program 108A, 108B for identifying the scope of the comment according to one embodiment is depicted. Specifically, at 704, the comment excerpt generator program 108A, 108B may perform text-tiling on the comment 702 to identify any subtopics in the comment 702. As previously described in FIG. 6, the comment excerpt generator program 108A, 108B may use a natural language processing technique to identify cross-sentence subject and object linkages between the subjects 608 and objects 610 associated with the extracted sentences. Additionally, and as illustrated in FIG. 7 at 704, the comment excerpt generator program 108A, 108B may use a natural language processing technique to perform text-tiling on the full comment text 706 to identify any subtopics in the comment and establish sentence boundaries between the sentences associated with the subtopic and the sentences associated with the overall topic in the relevant sentence 714 using subtopic segmentation. As shown in FIG. 7, in the case of the comment text 706, no further subtopic was detected within the text, and thus, subtopic segmentation by the natural language processing technique is not necessary. However, as a separate example, the overall topic in the comment text 706 may include the different states of actin polymerization. If, for example, the comment text 706 went on to discuss a specific state of actin polymerization, the comment excerpt generator program 108A, 108B may identify the sentences in the comment text 706 that discuss the specific state as a subtopic and may perform subtopic segmentation to establish boundaries between the sentences associated with the subtopic and the sentences associated with the topic discussed in the relevant comment 714.

Figure 8:
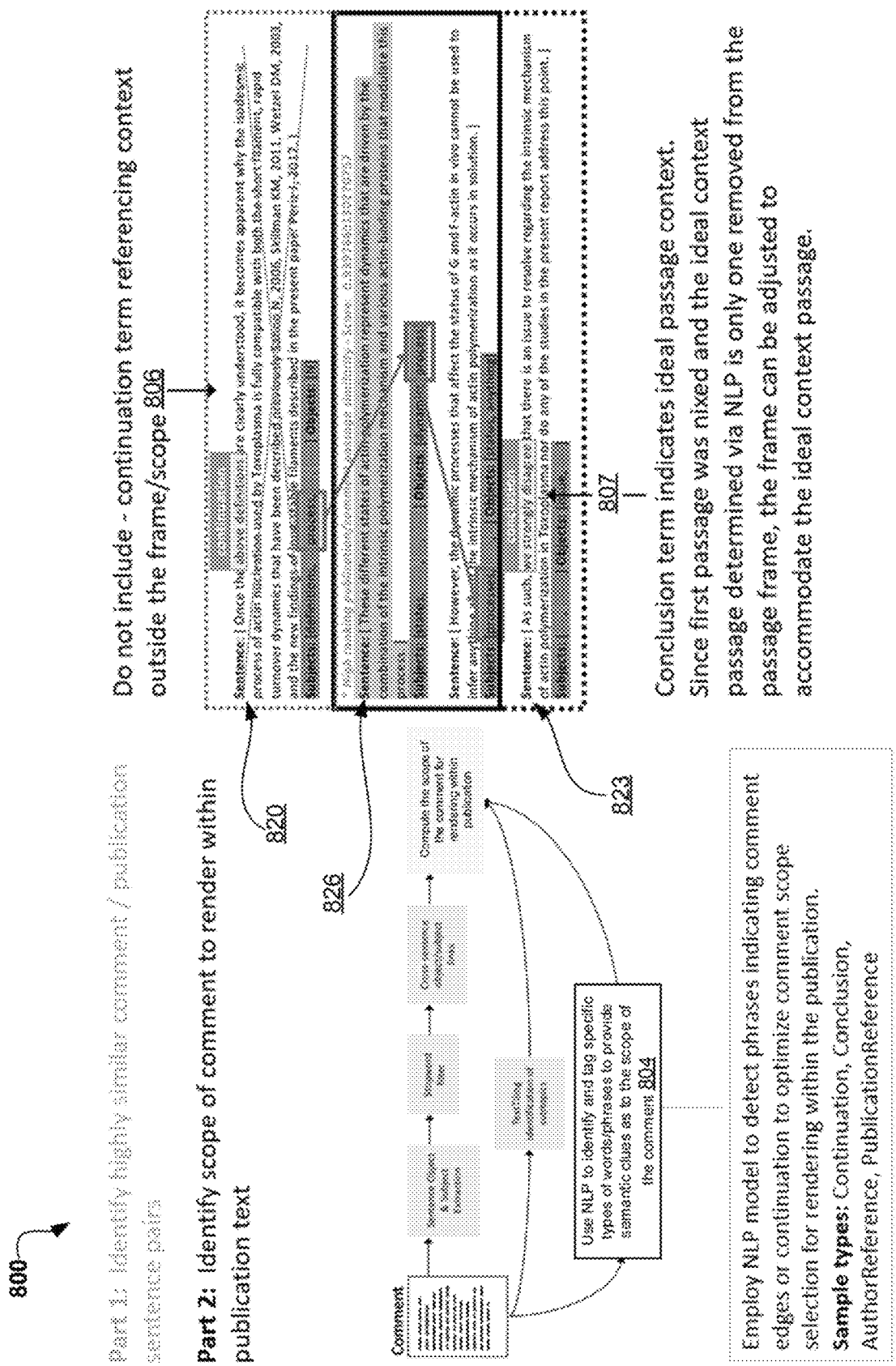
FIG. 8 is an exemplary diagram illustrating a fifth step in a process associated with the comment excerpt generator program for identifying the scope of a comment extracted from a comments section according to one embodiment.

Then, in FIG. 8, an exemplary diagram 800 illustrating a step 804 in the comment excerpt generator program 108A, 108B for identifying the scope of the comment according to one embodiment is depicted. Specifically, at 804, the comment excerpt generator program 108A, 108B may use a natural language processing technique to detect one or more specific types of words and/or phrases. As previously described in FIG. 7, the comment excerpt generator program 108A, 108B may use a natural language processing technique to perform text-tiling on the full comment text 706 to identify any subtopics. Additionally, the comment excerpt generator program 108A, 108B may use a natural language processing technique to detect one or more specific types of words and/or phrases 806, 807 in each of the sentences to provide a further indication of the scope of the comment, and/or to further optimize the scope of the comment based on the determinations in FIGS. 6 and 7. For example, the detected phrases 806, 807 may include conjunctive words/phrases (i.e. consequently, as a result, therefore, furthermore, etc.) as well as certain reference words/phrases (i.e. words that reference other sentences, comments, authors, and/or publications). Furthermore, the comment excerpt generator program 108A, 108B may use the conjunctive words/phrases and the reference words/phrases to detect context edges of the scope of the comment, whereby the context edges may include the sentences that are determined to be within the scope of the relevant sentence and those that are outside the scope of the relevant sentence.

For example, and as shown in FIG. 8, the comment excerpt generator program 108A, 108B may detect that the first sentence 820 in the comment may include the phrase 806, "above definitions." In turn, based on the natural language processing technique, the comment excerpt generator program 108A, 108B may determine that the phrase 806, "above definitions," is a continuation term that seems to reference content outside of the comment and/or outside of the scope of the comment. Furthermore, for example, the comment excerpt generator program 108A, 108B may detect that the fourth sentence 823 (also see FIG. 4) includes the phrase 807, "we strongly disagree." The comment excerpt generator program 108A, 108B may, in turn, determine that the phrase 807, "we strongly agree," may be a conclusion term that further provides context to the relevant sentence 826. As such, the comment excerpt generator program 108A, 108B may not include the first sentence 820 in the scope of the comment, however, may include the fourth sentence 823. The comment excerpt generator program 108A, 108B may go on to perform phrase detection on each of the sentences in the comment to further provide an indication of the scope of the comment. However, for illustrative brevity, only the first, third, and fourth sentences 820, 823 surrounding the relevant sentence 826 are illustrated in FIG. 8.

Figure 9:
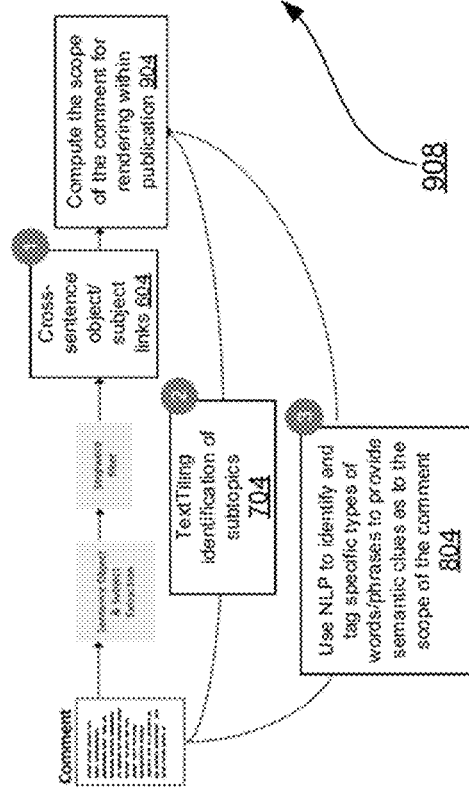
FIG. 9 is an exemplary diagram illustrating a sixth step in a process associated with the comment excerpt generator program for identifying the scope of a comment extracted from a comments section according to one embodiment.

Referring now to FIG. 9, an exemplary diagram 900 illustrating a step 904 in the comment excerpt generator program 108A, 108B for identifying the scope of the comment according to one embodiment is depicted. Specifically, at 904, the comment excerpt generator program 108A, 108B may use the inputs discussed in FIGS. 6-8 to compute the scope of the comment, or more specifically, to determine an optimal comment scope for displaying in a comment excerpt 206 (FIG. 2). As previously described in FIG. 6 and labeled as input 1 in FIG. 9, the comment excerpt generator program 108A, 108B may identify cross-sentence subject and object linkages between the subjects 608 (FIG. 6) and objects 610 (FIG. 6) of the extracted sentences. Furthermore, as previously described in FIG. 7 and labeled as input 2 in FIG. 9, the comment excerpt generator program 108A, 108B may perform text-tiling on the full comment text 706 (FIG. 7) to identify any subtopics. Additionally, and as previously described in FIG. 8 and labeled as input 3 in FIG. 9, the comment excerpt generator program 108A, 108B may detect specific types of words and/or phrases in each of the sentences to further provide an indication of the scope of the comment. Therefore, the comment excerpt generator program 108A, 108B may use inputs 1, 2, and 3 to compute the scope of the comment for displaying in a comment excerpt 206 (FIG. 2).

Specifically, according to one embodiment, the comment excerpt generator program 108A, 108B may use inputs 1 and 2 to initially identify the scope of the comment, or identify a context frame, based on the identified relevant sentence. Furthermore, the comment excerpt generator program 108A, 108B may use input 3 to detect the context edges of the scope of the comment, whereby detecting the context edges may include identifying terms that indicate whether a sentence reference is outside of the context frame and/or detecting whether there are assertive conclusion terms pertaining to the relevant sentence that should be included in the context frame (as described in FIG. 8). Additionally, according to one embodiment, the comment excerpt generator program 108A, 108B may include pseudocode having logical rules 908 for determining which inputs to use in generating the scope of the comment. For example, the logical rules 908 may include a rule where "if input 1 identifies a context frame that is exactly 4 sentences, use this frame, Else use input 1 & 3 as the frame." Therefore, based on the rule, if the comment excerpt generator program 108A, 108B identifies 4 linked sentences in response to performing cross-sentence subject and object linkage analysis, the comment excerpt generator program 108A, 108B may use the identified 4 sentences for the scope of the comment. However, in response to the comment excerpt generator program 108A, 108B not identifying 4 sentences based on input 1, the comment excerpt generator program 108A, 108B may also include input 3 along with input 1 in determining the scope of the comment.

Figure 10:
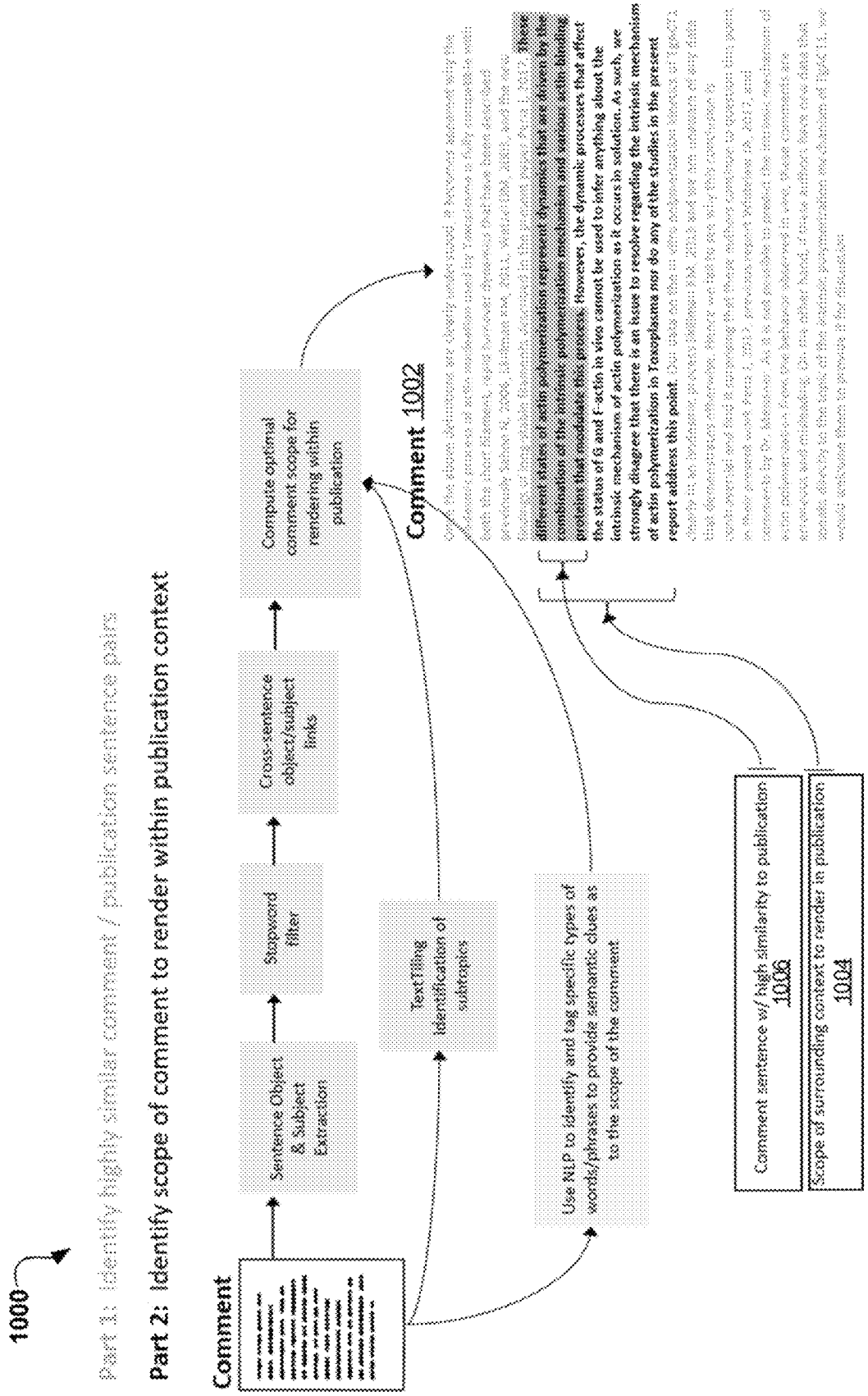
FIG. 10 is an exemplary diagram illustrating a seventh step in a process associated with the comment excerpt generator program for identifying the scope of a comment extracted from a comments section according to one embodiment.

Referring now to FIG. 10, an exemplary diagram 1000 illustrating an example of the scope of the comment as determined by the comment excerpt generator program 108A, 108B according to one embodiment is depicted. Specifically, based on the processes described in FIGS. 3-9, the comment excerpt generator program 108A, 108B, may determine that the scope of the comment 1004 may include the relevant sentence 1006 as well as the third sentence and the fourth sentence in the comment 1002.

More specifically, and as previously described in FIG. 6, the comment excerpt generator program 108A, 108B may determine that there are cross-sentence subject and object linkages between the subjects 608 (FIG. 6) and objects 610 (FIG. 6) of the first sentence 612, the relevant sentence 614, and the third sentence 616. Thereafter, and as previously described in FIG. 7, the comment excerpt generator program 108A, 108B may perform text-tiling on the full comment text 706 (FIG. 7) and determine that there are no identified subtopics within the comment text 706. Additionally, and as previously described in FIG. 8, the comment excerpt generator program 108A, 108B may detect specific types of words and/or phrases in each of the sentences in the comments, whereby the comment excerpt generator program 108A, 108B may detect that the first sentence 820 in the comment may include the phrase 806, "above definitions." Thus, even though the comment excerpt generator program 108A, 108B determined that there was a cross-sentence subject and object linkage between the first sentence and the relevant sentence in FIG. 6, the comment excerpt generator program 108A, 108B may determine that the phrase 806, "above definitions," is a continuation term that seems to reference content outside of the comment, and therefore, may not include the first sentence 820 in the scope of the comment as illustrated in FIG. 8. Furthermore, the comment excerpt generator program 108A, 108B may determine that the phrase 807 (FIG. 8), "we strongly agree," in the fourth sentence may be a conclusion term that further provides context to the relevant sentence. As such, the comment excerpt generator program 108A, 108B may include the fourth sentence 823 in the scope of the comment. Furthermore, and as described in FIG. 9, the comment excerpt generator program 108A, 108B may use the rule where "if input 1 identifies a context frame that is exactly 4 sentences, use this frame, Else use input 1 & 3 as the frame." Therefore, because the cross-sentence subject and object linkage analysis (i.e. input 1) did not identify 4 sentences, the comment excerpt generator program 108A, 108B may use a combination of the cross-sentence subject and object linkage analysis (input 1) with the detection of specific types of words and/or phrases (input 3) to determine the scope of the comment. As such, the comment excerpt generator program 108A, 108B may determine that the scope of the comment 1004 includes the relevant sentence 1006, the third sentence based on input 1 (see FIG. 6), and the fourth sentence based on input 3 but not the first sentence (see FIG. 8).

Thereafter, and as previously described in FIG. 2, the comment excerpt generator program 108A, 108B may generate a comment excerpt 206 that includes the scope of the comment 1004 and display the comment excerpt 206 in the online publication as shown in FIG. 2 (also see, specifically, the first comment excerpt in FIG. 2 at 206). Furthermore, and as previously described in FIG. 2, the comment excerpt generator program 108A, 108B may generate one or more second expand/collapse icons 208 for each of the comment excerpts 206 to allow a user to view in the comment excerpt window 210 the full comment associated with the respective comment excerpt 206.

It may be appreciated that FIGS. 1-10 provide only illustrations of one implementation and does not imply any limitations with regard to how different embodiments may be implemented. Many modifications to the depicted environments may be made based on design and implementation requirements. For example, the comment excerpt generator program 108A, 108B may, in real-time, generate and present the comment excerpts 206 in the online publication 202 based on the process described in FIGS. 2-10. Specifically, in response to receiving a comment in a comments section (i.e. in response to a user clicking on a "SUBMIT" button or pressing "ENTER" on a keyboard to submit a comment), the comment excerpt generator program 108A, 108B may, in real-time, identify and extract a relevant sentence from the comment, determine the scope of the comment, and generate in the text associated with the online publication a comment excerpt including the scope of the comment and the relevant sentence.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
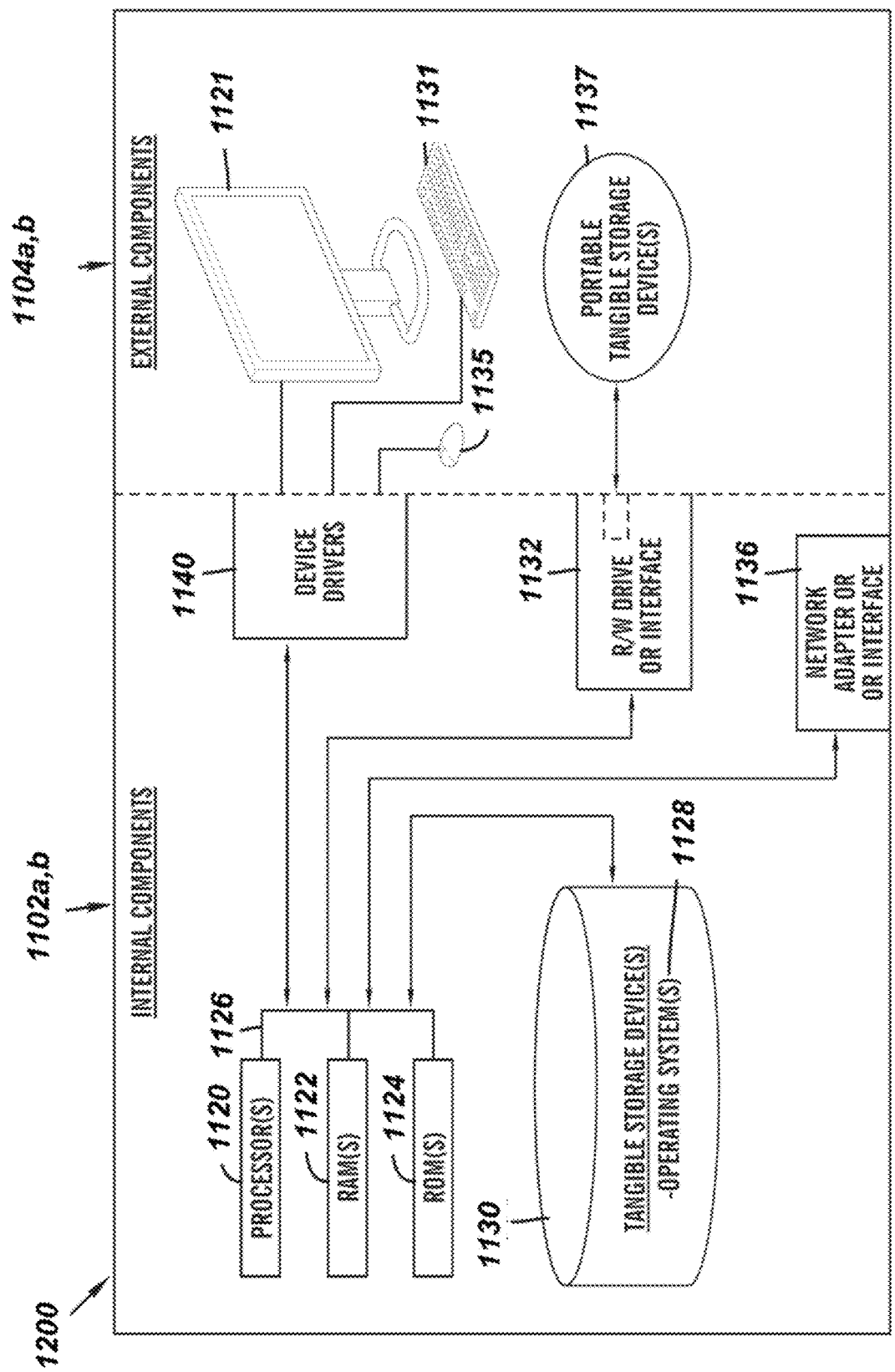
FIG. 11 is a block diagram of the system architecture of the program for generating and presenting at least one comment excerpt in an online publication based on a comment in a comments section associated with the online publication according to one embodiment.

FIG. 11 is a block diagram 1100 of internal and external components of computers depicted in FIG. 1 in accordance with an illustrative embodiment of the present invention. It should be appreciated that FIG. 11 provides only an illustration of one implementation and does not imply any limitations with regard to the environments in which different embodiments may be implemented. Many modifications to the depicted environments may be made based on design and implementation requirements.

Data processing system 110, 1104 is representative of any electronic device capable of executing machine-readable program instructions. Data processing system 1102, 1104 may be representative of a smart phone, a computer system, PDA, or other electronic devices. Examples of computing systems, environments, and/or configurations that may represented by data processing system 1102, 1104 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 1102 *a, b* and external components 1104 *a, b* illustrated in FIG. 11. Each of the sets of internal components 1102 *a, b* includes one or more processors 1120, one or more computer-readable RAMs 1122, and one or more computer-readable ROMs 1124 on one or more buses 1126, and one or more operating systems 1128 and one or more computer-readable tangible storage devices 1130. The one or more operating systems 1128, the software program 114 (FIG. 1) and the comment excerpt generator program 108A (FIG. 1) in client computer 102 (FIG. 1), and the comment excerpt generator program 108B (FIG. 1) in network server computer 112 (FIG. 1) are stored on one or more of the respective computer-readable tangible storage devices 1130 for execution by one or more of the respective processors 1120 via one or more of the respective RAMs 1122 (which typically include cache memory). In the embodiment illustrated in FIG. 11, each of the computer-readable tangible storage devices 1130 is a magnetic disk storage device of an internal hard drive. Alternatively, each of the computer-readable tangible storage devices 1130 is a semiconductor storage device such as ROM 1124, EPROM, flash memory or any other computer-readable tangible storage device that can store a computer program and digital information.

Each set of internal components 1102 *a, b*, also includes a R/W drive or interface 1132 to read from and write to one or more portable computer-readable tangible storage devices 1137 such as a CD-ROM, DVD, memory stick, magnetic tape, magnetic disk, optical disk or semiconductor storage device. A software program, such as a comment excerpt generator program 108A and 108B (FIG. 1), can be stored on one or more of the respective portable computer-readable tangible storage devices 1137, read via the respective R/W drive or interface 1132, and loaded into the respective hard drive 1130.

Each set of internal components 1102 *a, b* also includes network adapters or interfaces 1136 such as a TCP/IP adapter cards, wireless Wi-Fi interface cards, or 3G or 4G wireless interface cards or other wired or wireless communication links. The comment excerpt generator program 108A (FIG. 1) and software program 114 (FIG. 1) in client computer 102 (FIG. 1), and the comment excerpt generator program 108B (FIG. 1) in network server 112 (FIG. 1) can be downloaded to client computer 102 (FIG. 1) from an external computer via a network (for example, the Internet, a local area network or other, wide area network) and respective network adapters or interfaces 1136. From the network adapters or interfaces 1136, the comment excerpt generator program 108A (FIG. 1) and software program 114 (FIG. 1) in client computer 102 (FIG. 1) and the comment excerpt generator program 108B (FIG. 1) in network server computer 112 (FIG. 1) are loaded into the respective hard drive 1130. The network may comprise copper wires, optical fibers, wireless transmission, routers, firewalls, switches, gateway computers, and/or edge servers.

Each of the sets of external components 1104 *a, b* can include a computer display monitor 1121, a keyboard 1131, and a computer mouse 1135. External components 1104 *a, b* can also include touch screens, virtual keyboards, touch pads, pointing devices, and other human interface devices. Each of the sets of internal components 1102 *a, b* also includes device drivers 1140 to interface to computer display monitor 1121, keyboard 1131, and computer mouse 1135. The device drivers 1140, R/W drive or interface 1132, and network adapter or interface 1136 comprise hardware and software (stored in storage device 1130 and/or ROM 1124).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
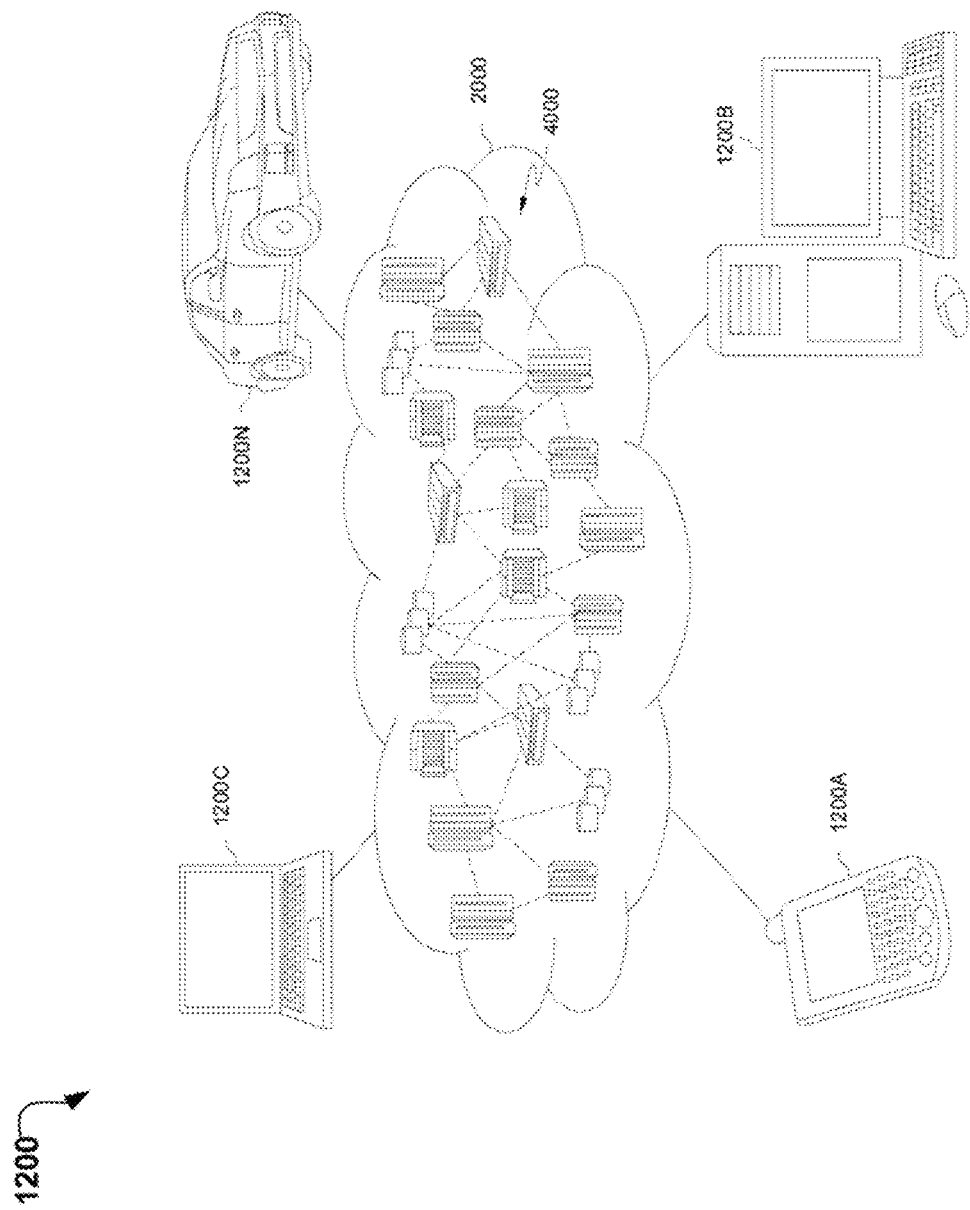
FIG. 12 is a block diagram of an illustrative cloud computing environment including the computer system depicted in FIG. 1, in accordance with an embodiment of the present disclosure.

Referring now to FIG. 12, illustrative cloud computing environment 1200 is depicted. As shown, cloud computing environment 1200 comprises one or more cloud computing nodes 4000 with which local computing devices used by cloud consumers, such as, for example, personal digital assistant (PDA) or cellular telephone 1200A, desktop computer 1200B, laptop computer 1200C, and/or automobile computer system 1200N may communicate. Nodes 4000 may communicate with one another. They may be grouped (not shown) physically or virtually, in one or more networks, such as Private, Community, Public, or Hybrid clouds as described hereinabove, or a combination thereof. This allows cloud computing environment 2000 to offer infrastructure, platforms and/or software as services for which a cloud consumer does not need to maintain resources on a local computing device. It is understood that the types of computing devices 1200A-N shown in FIG. 8 are intended to be illustrative only and that computing nodes 4000 and cloud computing environment 2000 can communicate with any type of computerized device over any type of network and/or network addressable connection (e.g., using a web browser).

Figure 13:
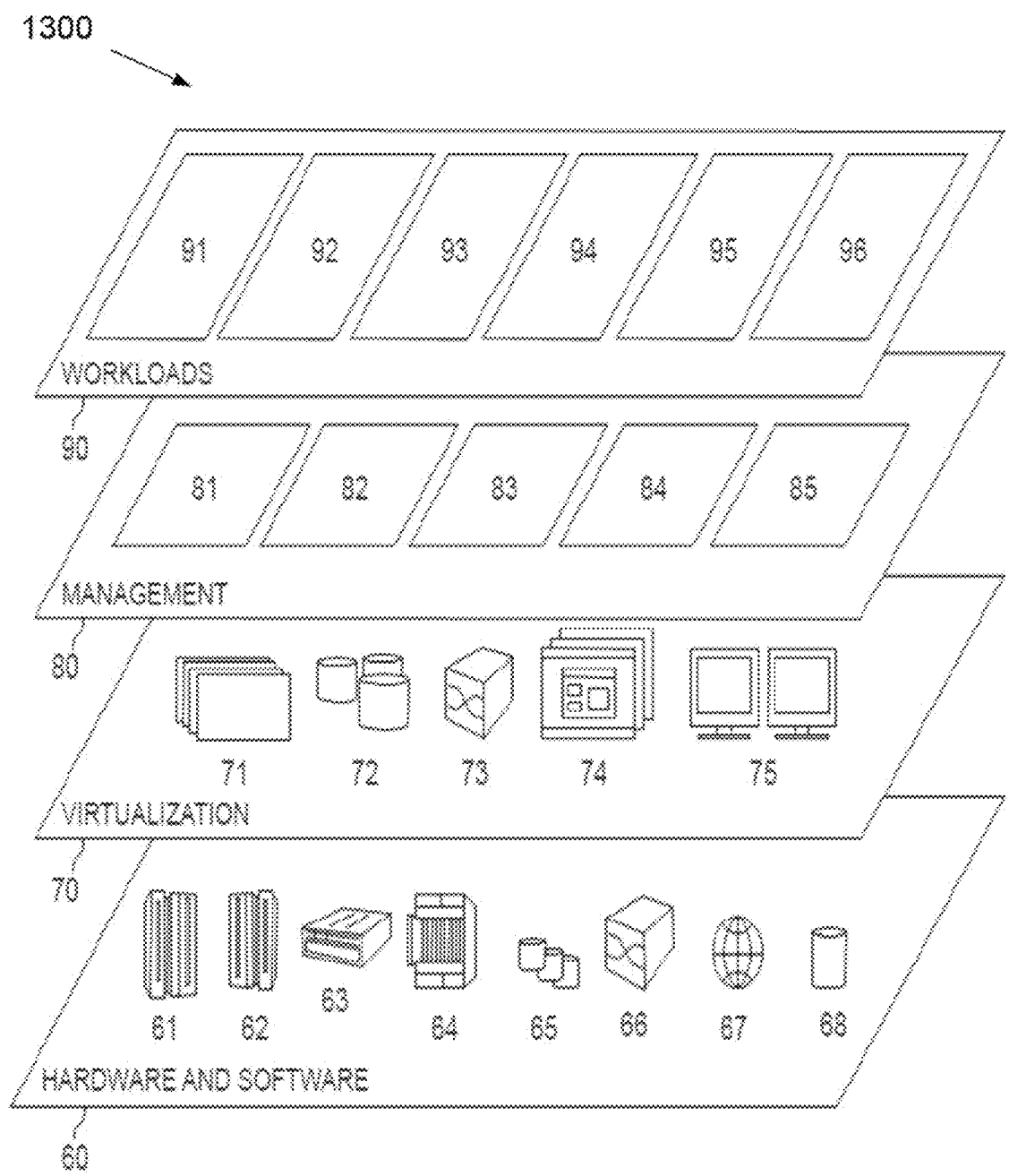
FIG. 13 is a block diagram of functional layers of the illustrative cloud computing environment of FIG. 12, in accordance with an embodiment of the present disclosure.

Referring now to FIG. 13, a set of functional abstraction layers 1300 provided by cloud computing environment 1200 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and comment excerpt generator 96. A comment excerpt generator program 108A, 108B (FIG. 1) may be offered "as a service in the cloud" (i.e., Software as a Service (SaaS)) for applications running on computing devices 102 (FIG. 1) and may, on a computing device, generate and present comment excerpts in an online publication based on comments in a comments section associated with the online publication.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating and presenting at least one comment excerpt in an online publication based on a comment in a comments section associated with the online publication, the method comprising:
    determining whether at least one passage from the comment in the comments section is relevant to at least one sentence in the online publication, and in response to determining that the at least one passage from the comment in the comments section is relevant to the at least one sentence in the online publication, extracting the at least one passage from the comment;
    determining the scope of the comment that is associated with the extracted at least one passage, wherein determining the scope of the comment comprises determining a context associated with the extracted at least one passage based on text surrounding the extracted at least one passage in the comment;
    based on the determined scope of the comment, generating the at least one comment excerpt that corresponds to the comment in the comments section, wherein the at least one comment excerpt includes the extracted at least one passage and extracted surrounding text based on the determined scope of the comment; and
    presenting the at least one comment excerpt within the online publication by aligning the at least one comment excerpt with the at least one sentence in the online publication.

2. The method of claim 1, wherein presenting the at least one comment excerpt further comprises:
    generating and presenting a first expand and collapse icon that is aligned with the at least one sentence in the online publication, wherein the first expand and collapse icon corresponds to a comment excerpt window comprising the at least one comment except, and wherein the first expand and collapse icon expands and collapses the comment excerpt window to present and hide the at least one comment excerpt.

3. The method of claim 2, wherein the comment excerpt window further comprises at least one second expand and collapse icon corresponding to the at least one comment excerpt, wherein the at least one second expand and collapse icon expands and collapses a window associated with the at least one comment excerpt to present and hide full text associated with the comment in the comments section.

4. The method of claim 1, wherein presenting the at least one comment excerpt within the online publication further comprises:
    presenting a relevancy score indicating a level of relevancy between the at least one comment excerpt and the at least one sentence in the online publication.

5. The method of claim 1, wherein presenting the at least one comment excerpt within the online publication further comprises:
    highlighting the at least one sentence in the online publication or causing the at least one sentence to be highlighted in response to a user moving a cursor over the at least one sentence.

6. The method of claim 1, wherein determining the scope of the comment that is associated with the extracted at least one passage further comprises:
    computing the scope of the comment based on inputs comprising cross-sentence subject and object analysis, text-tiling to identify subtopics in the comment, natural language processing techniques to identify specific types of words and phrases that semantically indicate the context of the at least one passage.

7. The method of claim 6, wherein determining the scope of the comment further comprises:
    using logical rules associated with the inputs to compute the scope of the comment.

8. A computer system for generating and presenting at least one comment excerpt in an online publication based on a comment in a comments section associated with the online publication, comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    determining whether at least one passage from the comment in the comments section is relevant to at least one sentence in the online publication, and in response to determining that the at least one passage from the comment in the comments section is relevant to the at least one sentence in the online publication, extracting the at least one passage from the comment;
    determining the scope of the comment that is associated with the extracted at least one passage, wherein determining the scope of the comment comprises determining a context associated with the extracted at least one passage based on text surrounding the extracted at least one passage in the comment;
    based on the determined scope of the comment, generating the at least one comment excerpt that corresponds to the comment in the comments section, wherein the at least one comment excerpt includes the extracted at least one passage and extracted surrounding text based on the determined scope of the comment; and presenting the at least one comment excerpt within the online publication by aligning the at least one comment excerpt with the at least one sentence in the online publication.

9. The computer system of claim 8, wherein presenting the at least one comment excerpt further comprises:

generating and presenting a first expand and collapse icon that is aligned with the at least one sentence in the online publication, wherein the first expand and collapse icon corresponds to a comment excerpt window comprising the at least one comment except, and wherein the first expand and collapse icon expands and collapses the comment excerpt window to present and hide the at least one comment excerpt.

10. The computer system of claim 9, wherein the comment excerpt window further comprises at least one second expand and collapse icon corresponding to the at least one comment excerpt, wherein the at least one second expand and collapse icon expands and collapses a window associated with the at least one comment excerpt to present and hide full text associated with the comment in the comments section.

11. The computer system of claim 8, wherein presenting the at least one comment excerpt within the online publication further comprises:

presenting a relevancy score indicating a level of relevancy between the at least one comment excerpt and the at least one sentence in the online publication.

12. The computer system of claim 8, wherein presenting the at least one comment excerpt within the online publication further comprises:

highlighting the at least one sentence in the online publication or causing the at least one sentence to be highlighted in response to a user moving a cursor over the at least one sentence.

13. The computer system of claim 8, wherein determining the scope of the comment that is associated with the extracted at least one passage further comprises:

computing the scope of the comment based on inputs comprising cross-sentence subject and object analysis, text-tiling to identify subtopics in the comment, natural language processing techniques to identify specific types of words and phrases that semantically indicate the context of the at least one passage.

14. The computer system of claim 13, wherein determining the scope of the comment further comprises:

using logical rules associated with the inputs to compute the scope of the comment.

15. A computer program product for generating and presenting at least one comment excerpt in an online publication based on a comment in a comments section associated with the online publication, comprising:

one or more tangible computer-readable storage devices and program instructions stored on at least one of the one or more tangible computer-readable storage devices, the program instructions executable by a processor, the program instructions comprising:

program instructions to determine whether at least one passage from the comment in the comments section is relevant to at least one sentence in the online publication, and in response to determining that the at least one passage from the comment in the comments section is relevant to the at least one sentence in the online publication, program instructions to extract the at least one passage from the comment;

program instructions to determine the scope of the comment that is associated with the extracted at least one passage, wherein determining the scope of the comment comprises program instructions to determine a context associated with the extracted at least one passage based on text surrounding the extracted at least one passage in the comment;

based on the determined scope of the comment, program instructions to generate the at least one comment excerpt that corresponds to the comment in the comments section, wherein the at least one comment excerpt includes the extracted at least one passage and extracted surrounding text based on the determined scope of the comment; and program instructions to present the at least one comment excerpt within the online publication by aligning the at least one comment excerpt with the at least one sentence in the online publication.

16. The computer program product of claim 15, wherein the program instructions to present the at least one comment excerpt further comprises:

program instructions to generate and present a first expand and collapse icon that is aligned with the at least one sentence in the online publication, wherein the first expand and collapse icon corresponds to a comment excerpt window comprising the at least one comment except, and wherein the first expand and collapse icon expands and collapses the comment excerpt window to present and hide the at least one comment excerpt.

17. The computer program product of claim 16, wherein the comment excerpt window further comprises at least one second expand and collapse icon corresponding to the at least one comment excerpt, wherein the at least one second expand and collapse icon expands and collapses a window associated with the at least one comment excerpt to present and hide full text associated with the comment in the comments section.

18. The computer program product of claim 15, wherein the program instructions to present the at least one comment excerpt within the online publication further comprises:

program instructions to present a relevancy score indicating a level of relevancy between the at least one comment excerpt and the at least one sentence in the online publication.

19. The computer program product of claim 15, wherein the program instructions to determine the scope of the comment that is associated with the extracted at least one passage further comprises:

program instructions to compute the scope of the comment based on inputs comprising cross-sentence subject and object analysis, text-tiling to identify subtopics in the comment, and natural language processing techniques to identify specific types of words and phrases that semantically indicate the context of the at least one passage.

20. The computer program product of claim 19, wherein the program instructions to determine the scope of the comment further comprises:

program instructions to use logical rules associated with the inputs to compute the scope of the comment.

* * * * *